United States Patent
Kim et al.

(10) Patent No.: US 10,664,891 B2
(45) Date of Patent: May 26, 2020

(54) SERVICE METHOD AND SYSTEM FOR RECOMMENDING POST BY ASSOCIATING APPSTORE WITH TIMELINE

(71) Applicant: NHN Entertainment Corporation, Seongnam-si (KR)

(72) Inventors: Yuwon Kim, Seongnam-si (KR); Injae Song, Seongnam-si (KR); Young Jun Hong, Seongnam-si (KR); You Young Kim, Seongnam-si (KR); Jin Kyo Chung, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 938 days.

(21) Appl. No.: 14/812,944

(22) Filed: Jul. 29, 2015

(65) Prior Publication Data

US 2016/0035002 A1    Feb. 4, 2016

(30) Foreign Application Priority Data

Jul. 31, 2014  (KR) .......................... 10-2014-0098304

(51) Int. Cl.
*G06Q 30/00* (2012.01)
*G06Q 30/06* (2012.01)

(52) U.S. Cl.
CPC ................. *G06Q 30/0631* (2013.01)

(58) Field of Classification Search
CPC ................................................ G06Q 30/0631

(Continued)

(56) References Cited

U.S. PATENT DOCUMENTS

2012/0214451 A1* 8/2012 Richardson ........... H04W 12/12
                                                                455/414.1
2013/0031489 A1* 1/2013 Gubin .................... G06Q 10/10
                                                                715/753

(Continued)

FOREIGN PATENT DOCUMENTS

JP          2012-256252        12/2012
JP          2014-029635         2/2014

(Continued)

OTHER PUBLICATIONS

"ODDM/Potgate Story, Carefully Check the Potgate even the Appstore Reviews", Smart App Portal, Potgate Tistory, Nov. 30, 2011 (http://podgate.tistory.com).

*Primary Examiner* — Jason B Dunham
*Assistant Examiner* — Anand R Loharikar
(74) *Attorney, Agent, or Firm* — H.C. Park & Associates, PLC

(57) ABSTRACT

Exemplary embodiments provide a computer-implemented method of enabling a recommendation of a software to a user from a software marketplace based on activities of the user's friend of an internet-based social network who is related to the first user within the confines of the social network, said user maintaining an internet-based social network account, the method comprising: receiving, from the first user, a selection of an interface associated with the software marketplace, generating, by a computer-implemented recommendation system, a list of recommended software based on the internet-based social network into which the first user is logged into, sending the list of the of recommended software to the first user, wherein the computer-implemented recommendation system retrieves the information of the user's friend and assigns a weight to a post not displayed based on an attribute thereof.

7 Claims, 9 Drawing Sheets

(58) Field of Classification Search
USPC .............................................. 705/26.1–27.2
See application file for complete search history.

(56) References Cited

U.S. PATENT DOCUMENTS

2013/0185292 A1* 7/2013 Li ..................... G06F 17/30522
707/723
2015/0237083 A1 8/2015 Ohida et al.

FOREIGN PATENT DOCUMENTS

| JP | 5854275 | 12/2015 |
| KR | 10-2012-0101212 | 9/2012 |
| KR | 10-2013-0082879 | 7/2013 |
| WO | 2013/190697 | 12/2013 |
| WO | 2014/046272 | 3/2014 |

* cited by examiner

SERVICE METHOD AND SYSTEM FOR RECOMMENDING POST BY ASSOCIATING APPSTORE WITH TIMELINE

CROSS-REFERENCE TO RELATED APPLICATION

This application claims priority from and the benefit of Korean Patent Application No. 10-2014-0098304, filed on Jul. 31, 2014, which is hereby incorporated by reference for all purposes as if fully set forth herein.

BACKGROUND

1. Field

Example embodiments relate to a service method and system for providing a service by associating an application store (Appstore) with a timeline.

2. Discussion of the Background

A smartphone may additionally install and utilize an application (hereinafter, also referred to as "App") corresponding to an application program based on the purpose of use. In this regard, the smartphone fundamentally differs from a general mobile phone. In general, a user may download such an App in a terminal of the user through an application store (Appstore) and utilize the downloaded App.

The term "Appstore" refers to an online mobile contents market for selling a variety of Apps installable in a smartphone. Apps developed by developers such as individuals or companies may be uploaded to the Appstore and be sold to users.

Also, the Appstore provides a download page with respect to an App. The download page provides a link to download the App and includes comments of users on the corresponding App. However, many users commenting on a download page are generally users that comment on additional contents such as contents of an App download process or refund. Accordingly, it is difficult to acquire good quality information about the App itself.

The above information disclosed in this Background section is only for enhancement of understanding of the background of the inventive concept, and, therefore, it may contain information that does not form the prior art that is already known in this country to a person of ordinary skill in the art.

SUMMARY

Example embodiments provide a service method and system that may acquire a large amount of good quality information or tips about an App by providing a function capable of selecting an App from Apps in an Appstore and uploading a timeline post in association with the selected App, and by sharing the uploaded timeline post with friends having directly set a personal relationship with a user and friends having indirectly set a personal relationship with the user.

Also, example embodiments provide a service method and system that may recommend a reliable post compared to posts uploaded by many unspecific users through applying a weight to and thereby ranking posts uploaded by friends having indirectly set a personal relationship with a user based on a post attribute, such as a level of personal relationship with the user, a level of interest over a post, and favorite counts, and by displaying the ranked posts at a timeline of the user.

Additional features of the invention will be set forth in the description which follows, and, in part, will be apparent from the disclosure, or may be learned by practice of the inventive concept.

Exemplary embodiments disclose a computer-implemented method of enabling a recommendation of a software to a user from a software marketplace based on activities of the user's friend of an internet-based social network who is related to the first user within the confines of the social network, said user maintaining an internet-based social network account, the method comprising: receiving, from the first user, a selection of an interface associated with the software marketplace, generating, by a computer-implemented recommendation system, a list of recommended software based on the internet-based social network into which the first user is logged into, sending the list of the of recommended software to the first user, wherein the computer-implemented recommendation system retrieves the information of the user's friend and assigns a weight to a post not displayed based on an attribute thereof.

According to exemplary embodiments, the computer-implemented recommendation system further ranks the not-displayed post based on at least one of a level of interest over the not-displayed post, comment counts, subscription counts, click counts as favorite, favorite counts of the user over a creator of the not-displayed post, the number of friends of a post creator, and a distance indicating a level of personal relationship between the user and the post creator.

According to exemplary embodiments, step of the ranking may include assigning a relatively high weight to at least one of the favorite counts of the user over the creator of the not-displayed post, the distance, and the level of interest over the not-displayed post compared to the comment counts, the subscription counts, the click counts as favorite, and the number of friends of the post creator.

The service method may further include further displaying a ranked post through a download page of the single application selected from among the applications included in the Appstore.

Exemplary embodiments also disclose a service system including at least one storage unit and at least one processor. The at least one processor is configured to process a process of providing an Appstore service, and storing and managing information about users registered to the Appstore service and friend information between users having set a mutual personal relationship, for each of the users, a process of providing the users with a function capable of selecting a single application from among applications included in an Appstore and uploading a post through the Appstore service, a process of displaying posts uploaded to the selected single application at a timeline of a user, a process of assigning a weight to a post which is not displayed at the timeline of the user based on an attribute of the not-displayed post, and ranking the not-displayed post, and a process of displaying the ranked post at the timeline of the user.

It is to be understood that both the foregoing general description and the following detailed description are exemplary and explanatory and are intended to provide further explanation of the invention as claimed.

According to exemplary embodiments, since timeline posts uploaded by providing a function capable of selecting an App of an Appstore and uploading a timeline post in association with the selected App are displayed based on timelines of users and a download page of a corresponding App, users that are to download the App may acquire a large amount of good quality information or tips about the App.

Also, according to exemplary embodiments, since posts uploaded by friends having indirectly set a personal relationship with a user are weighted and thereby ranked based on a post attribute, such as a level of personal relationship with the user, a level of interest over a post, and favorite counts, and the ranked posts are displayed at a timeline of the user, users that are to download an App may receive a recommendation on a reliable post compared to posts uploaded by many unspecific users.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the invention.

DETAILED DESCRIPTION OF THE ILLUSTRATED EMBODIMENTS

Figure 1:
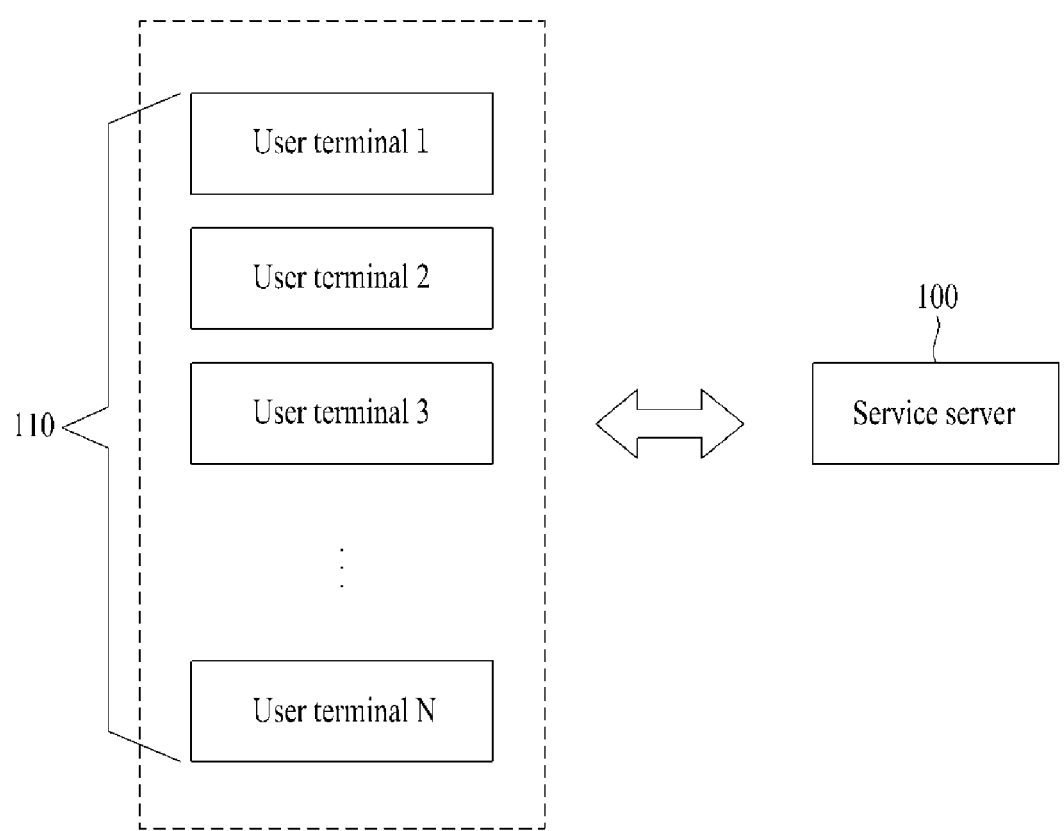
FIG. 1 is a diagram to describe an environment for providing a service by associating an application store (Appstore) with a timeline according to example embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

According to a service method for providing a service by associating an application store (Appstore) with a timeline according to example embodiments, in the case of downloading at least one of applications (Apps) included in an Appstore, it is possible to acquire information about an App desired to be downloaded from other users having directly and indirectly set a personal relationship with a user, and to recommend further reliable good quality of information or tips to the user.

FIG. 1 is a diagram to describe an environment for providing a service by associating an Appstore with a timeline according to example embodiments. FIG. 1 illustrates a service server 100 and a plurality of user terminals 110, for example, a user terminal 1, a user terminal 2, a user terminal 3, . . . , a user terminal N.

The service server 100 may be a server which provides a service to the user terminal 110 in response to a request of the user terminal 110 in which an App is installed among the plurality of user terminals 110.

The plurality of user terminals 110 refers to terminals of users using or likely to use a service provided from the service server 100, and may include a device capable of installing an App and being provided with a service by connecting to the service server 100 over a network according to a control of the installed App.

The service server 100 may provide a post associated with the App to users that are to download the App and users having downloaded the App through a timeline of the App. Here, when providing the post to the users, the service server 100 may rank posts uploaded by users having indirectly set a personal relationship with a user as well as posts uploaded by users having directly set a personal relationship with the user and thereby provide the ranked posts through a timeline.

Here, the timeline refers to a service provided to users through the App, and may include a function of sorting and displaying posts, for example, information such as a text, an image, a video, a sound, a link, and an event, of users, for example, friends, having directly set a mutual personal relationship and posts of users, for examples, friends of a friend, having indirectly set a mutual personal relationship. The timeline will be further described with reference to FIGS. 4 through 6.

Users having indirectly set a personal relationship with a user may include a user having indirectly set a personal relationship with the user by two or more distances, such as a friend of a friend of the user having indirectly set a friend relationship with the user although the user has not directly set the friend relationship or a friend of the friend of the friend of the user having indirectly set a friend relationship. The users having indirectly set a personal relationship with the user by two or more distances will be further described with reference to FIG. 2.

Although the service server 100 described in FIG. 1 may include a file distribution system (not shown) to provide a user terminal with an installation file corresponding to at least one App registered to an Appstore, it is only an example and the file distribution system may be a server separate from the service server 100. For example, when the file distribution system is a server configured to be separate from the service server 100, the file distribution system and the service server 100 may transmit and receive required data through communication between the file distribution system and the service server 100 over a computer network.

Here, the installation file is a file for installing an App included in the Appstore to the user terminal 110 and may be registered to the Appstore by at least one App provider or developer. For example, installation files corresponding to Apps may be registered to the Appstore in order to install a plurality of game Apps and a plurality of social network service (SNS) Apps.

Figure 2:
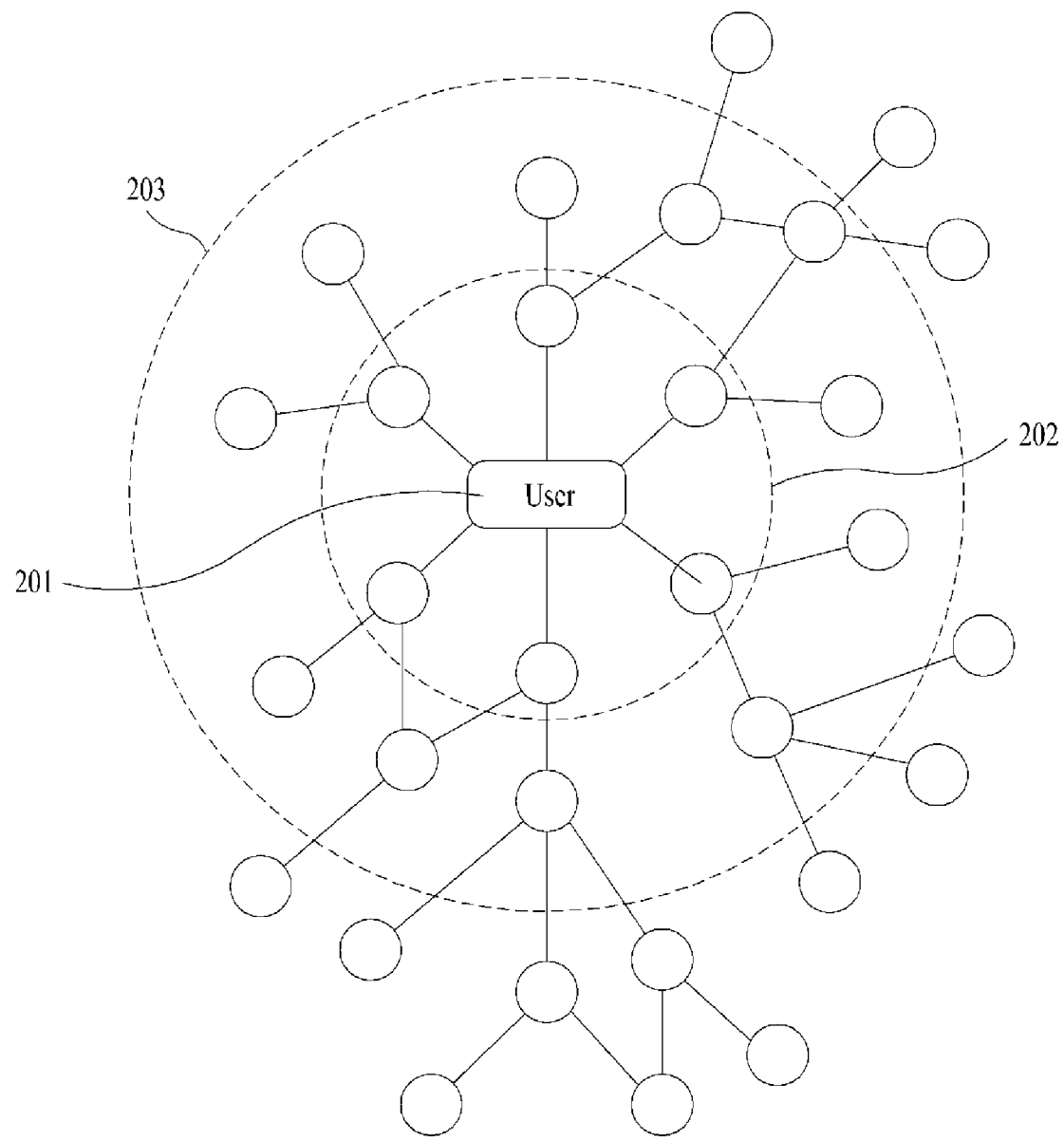
FIG. 2 is a diagram illustrating an example of a distance between a user and other users having directly and indirectly set a personal relationship with the user according to example embodiments.

FIG. 2 is a diagram illustrating an example of a distance between a user and other users having directly and indirectly set a personal relationship with the user according to example embodiments.

Referring to FIG. 2, a distance represents a psychological distance between a person and another person and may represent a psychological distance between other users having set a personal relationship with a user. For example, the distance may be a distance indicating a friend of the user and a friend of the friend of the user.

Referring to FIG. 2, in, for example, a game App and an SNS App, when a direct friend relationship with a user 201 is generated in a one-to-one manner, the distance may be "1". For example, as indicated by a dotted circle 202, users having directly set a personal relationship with the user 201 within the dotted circle 202 may have "1" as a distance indicating a relationship with the user 201.

In this example, other users having directly and indirectly set a personal relationship with the friends, for example, the users included in the dotted circle 203, of the user 201 do not have a direct personal relationship with the user 201, however, may also indirectly set a personal relationship with the user 201. When the personal relationship with the user 201 is indirectly set, a distance between the user 201 and the other users may be "2" or more.

For example, as indicated by a dotted circle 203, when the distance is "2", a friend of a friend of the user 201 may not directly set a personal relationship with the user 201, however, may directly set a personal relationship with a friend of the user 201 having directly set a personal relationship with the user 201. Similarly, when the distance is "3", a friend of the friend of the friend of the user 201 may not directly set a personal relationship with the user 201, however, may indirectly set a personal relationship with the user 201 through the friend of the user 201 or the friend of the friend of the user 201.

Referring to FIG. 2, the user 201 may indirectly set a personal relationship with still other users through other users having directly set a personal relationship with the user 201. Accordingly, a service server may provide the user 201 with posts uploaded by users having directly and indirectly set a personal relationship with the user 201 through a timeline of a corresponding App, thereby providing the user 201 with further reliable information and tips about the App.

Figure 3:
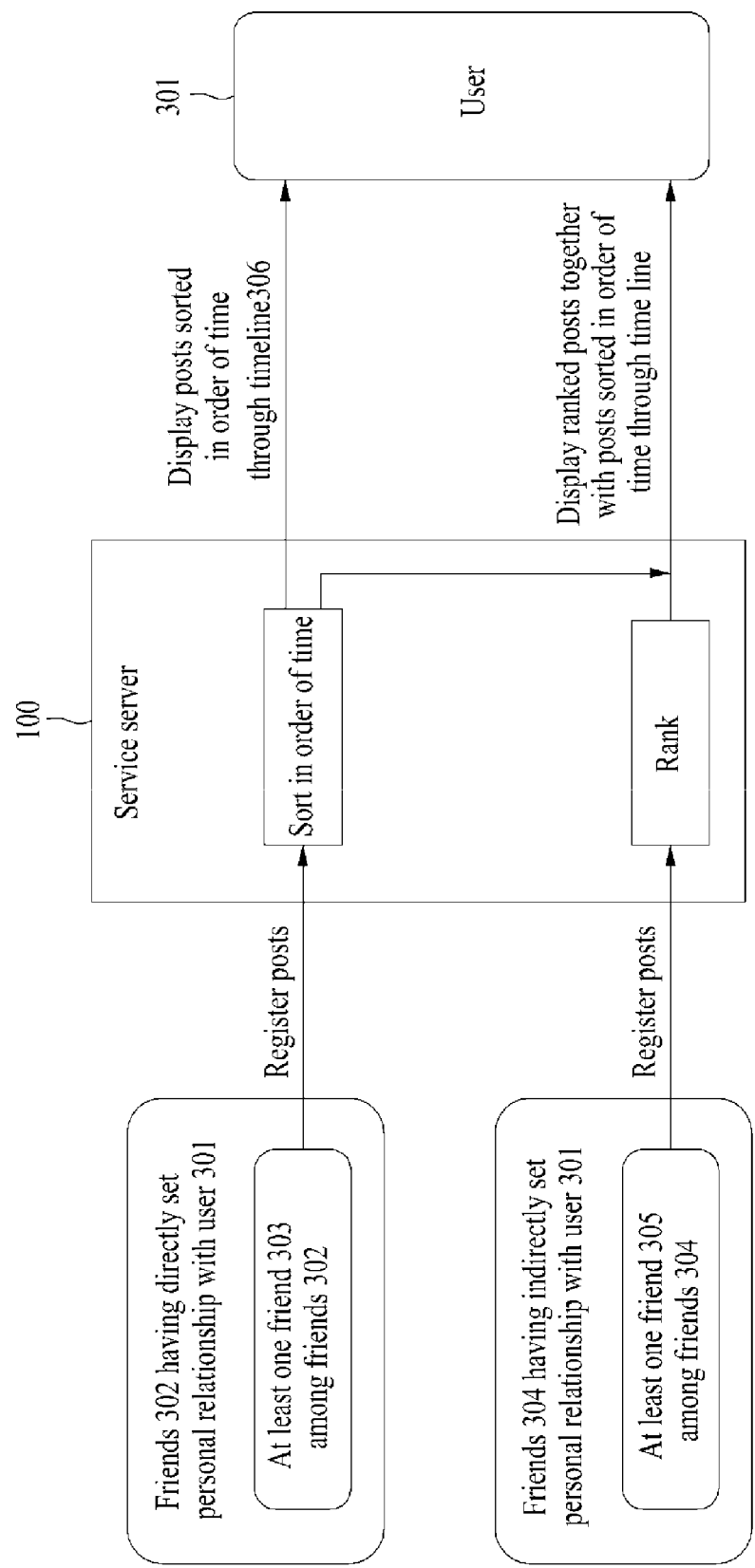
FIG. 3 illustrates an example of ranking process and thereby providing a post through a timeline according to example embodiments.

FIG. 3 illustrates an example of ranking process and thereby providing a post through a timeline according to example embodiments. Referring to FIG. 3, an operation of ranking which provides a post through a timeline may be performed by the service server 100.

The service server 100 may display information, for example, a post, about the App that a user is to download or the App executed by the user, through a timeline. Information displayed through the timeline may be shared with users having a direct and/or indirect personal relationship with the user.

For example, in a game App, the service server 100 may provide a timeline service and may provide users with a function of sharing a post. In this example, the service server 100 may display posts, such as game tips, an evaluation about a game, useful game information, and funny writings or videos about the game to users having a direct or indirect personal relationship with the user.

Referring to FIG. 3, at least one friend 303 among friends 302 having directly set a personal relationship with a user 301 may register a post. The friend 303 who has created the post may share the post with friends having directly and indirectly set a personal relationship using a sharing function. In this instance, the service server 100 may sort the post registered by the friend 303 in order of time and thereby display the sorted post through a timeline. That is, the service server 100 may sort posts uploaded by friends having directly set a personal relationship with the user 301 in order of time and may display the sorted posts on a terminal of the user 301 through a timeline of a corresponding App.

Here, at least one friend 305 among friends 304 having indirectly set a personal relationship with the user 301 may register a post. While displaying posts registered by the direct friends 302 of the user 301 through the timeline, the service server 100 may collect posts registered by the indirect friends 304 of the user 301. In this example, the service server 100 may store and maintain information of users registered to an Appstore service and friend information about users having a mutual personal relationship for each user, in order to collect the posts registered by the indirect friends 304.

The service server 100 may rank the posts registered by the indirect friends 304, may sort the ranked posts in descending order of rankings, and may display the sorted posts through the timeline. Here, the posts registered by the indirect friends 304 may be posts not displayed to the user 301, and the service server 100 may rank the posts by applying a weight to each post based on an attribute of each of the posts registered by the indirect friends 304.

For example, the service server 100 may apply a different weight to each post based on a level of interest, such as "like" counts over a not-displayed post, comment counts, subscription counts, click counts as favorite, favorite counts of the user 301 over a creator of the not-displayed post, the number of friends of a post creator, and a distance between the user 301 and the post creator. Here, the service server 100 may apply a relatively high weight compared to other parameters by using, alone or in combination, primary parameters such as the level of interest, the distance, and favorite counts over the post creator.

For example, the service server 100 may apply a relatively high weight to favorite counts of the user 301 over the post creator compared to other parameters. In detail, when "like" counts, comment counts, subscription counts, and click counts as favorite of post 1 are greater than those of post 2, and favorite counts of the user 301 over a creator of post 2 is greater than favorite count of the user 301 over a creator of post 1, the service server 100 may determine a ranking of post 2 to be above a ranking of post 1. In this example, when a sum of points of parameters excluding the favorite counts over a creator of a not-displayed post from the parameters for ranking is greater than or equal to reference points, the service server 100 may assign a relatively high weight to favorite counts over the creator of the corresponding post, instead of unconditionally applying a relatively high weight to the favorite counts.

As another example, the service server 100 may apply a relatively high weight according to a decrease in a distance from the user 301. For example, when a sum of points of parameters excluding the distance from the parameters for ranking is greater than or equal to reference points, the service server 100 may apply a relatively high weight according to a decrease in the distance between the user 301 and the post creator.

As another example, the service server 100 may apply a relatively high weight by combining at least two of the distance, the favorite counts over the post creator, and the level of interest over the post. In detail, the service server 100 may primarily rank the collected posts in descending order of points acquired by summing up parameters excluding the level of interest and the distance and then secondarily rank the primarily ranked posts based on "like" counts and the distance. For example, the service server 100 may apply a relatively high ranking to a post of which "like" counts is relatively great and of which distance is relatively close. Here, when posts having the same distance and "like" counts are present in secondary ranking, the service server 100 may apply a relatively high ranking to a post having relatively great favorite counts over a creator of the post.

In the same manner, the service server 100 may secondarily rank the primarily ranked posts based on the "like" counts and the favorite counts over the post creator. In this example, when posts having the same favorite counts and "like" counts are present, the service server 100 may apply a relatively high ranking to a post having a relatively close distance.

Likewise, the service server 100 may secondarily rank the primarily ranked posts based on the favorite counts and the distance. When posts having the same favorite counts and distance are present, the service server 100 may apply a relatively high ranking to a post having relatively great 'like' counts.

In addition, the service server 100 may limit the distance to be a reference distance such as "2" and "3", and may apply a relatively high weight to a post having a relatively high level of interest and relatively great favorite counts among posts corresponding to the reference distance.

Further, the service server 100 may apply a different weight to each of not-displayed posts and thereby rank the not-displayed posts by combining at least one of the example embodiments proposed herein.

As described above with reference to FIG. 3, the service server 100 may rank not-displayed posts using a variety of methods based on a level of interest over a post, comment counts, subscription counts, click counts as favorite, favorite counts over a post creator, the number of friends of the post creator, and a distance. The service server 100 may display the ranked posts to the user 301.

Referring to FIG. 3, the service server 100 may display the ranked posts prior to displaying 306 posts sorted in order of time and thereby already displayed through a timeline. For example, the service server 100 may display the ranked posts at an upper end of the timeline and subsequently display the posts sorted in order of time at a lower end of the timeline.

During displaying the ranked posts, the service server 100 may continuously collect and rank posts uploaded by the indirect friends 304 with respect to the corresponding App. The service server 100 may sort posts unread by the user 301 among the ranked posts and the already displayed ranked posts in order of time and thereby display the sorted unread posts through the timeline. For example, when a post unread by the user 301 among already displayed ranked posts is relatively close to a current point in time in terms of time compared to a currently ranked not-displayed post, the service server 100 may display the unread post at an upper end of the timeline.

Although the service server 100 is described in FIG. 3 to rank and thereby display posts uploaded by friends having directly or indirectly set a personal relationship with a user through a timeline of an App in order of time, it is only an example. The service server 100 may further display the ranked posts through a download page of the App. For example, the service server 100 may display posts about the App that a user is to download, uploaded by friends having directly and indirectly set a personal relationship with the user, on a download page of the App. Accordingly, the user may acquire further reliable useful information and tips about the App.

Figure 4:
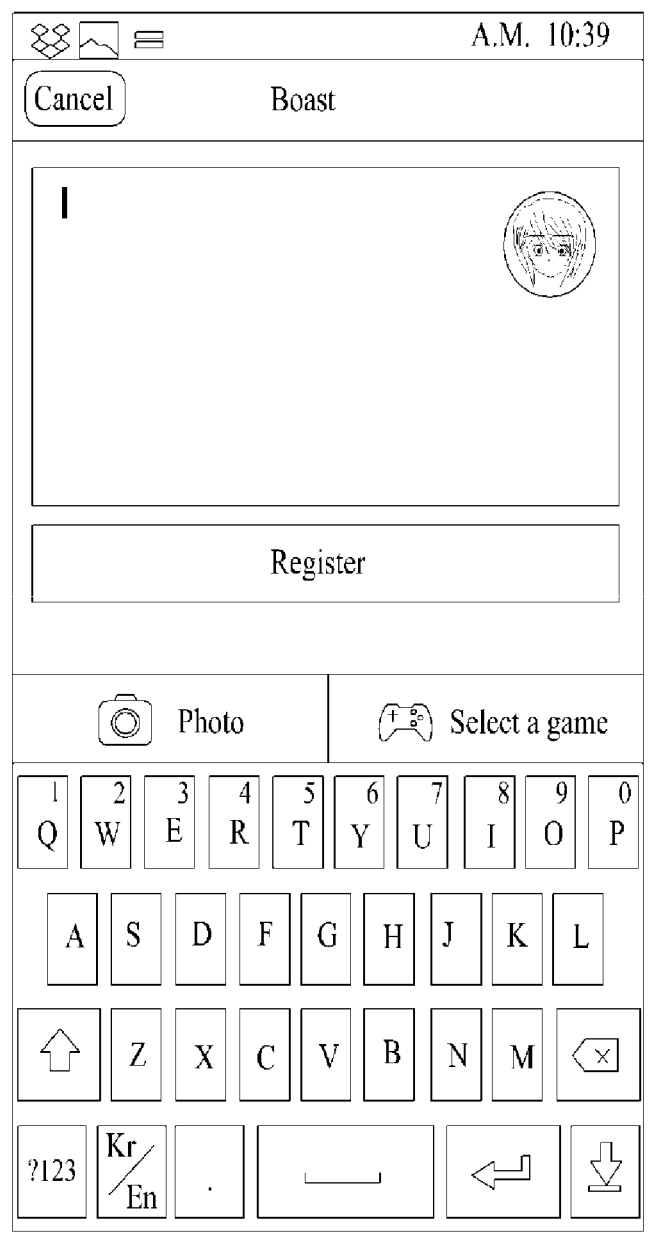
FIG. 4 illustrates an example of a screen on which a timeline post is uploaded according to example embodiments.

FIG. 4 illustrates an example of a screen on which a timeline post is uploaded according to example embodiments.

Referring to FIG. 4, the screen 400 shows an example of a user terminal screen. The user and friends having directly set a personal relationship with the user may upload, to the service server 100, posts including a variety of data such as a text, an image, a video, and a link, using a user interface displayed on the screen 400 of a user terminal according to a control of an App.

Figure 5:
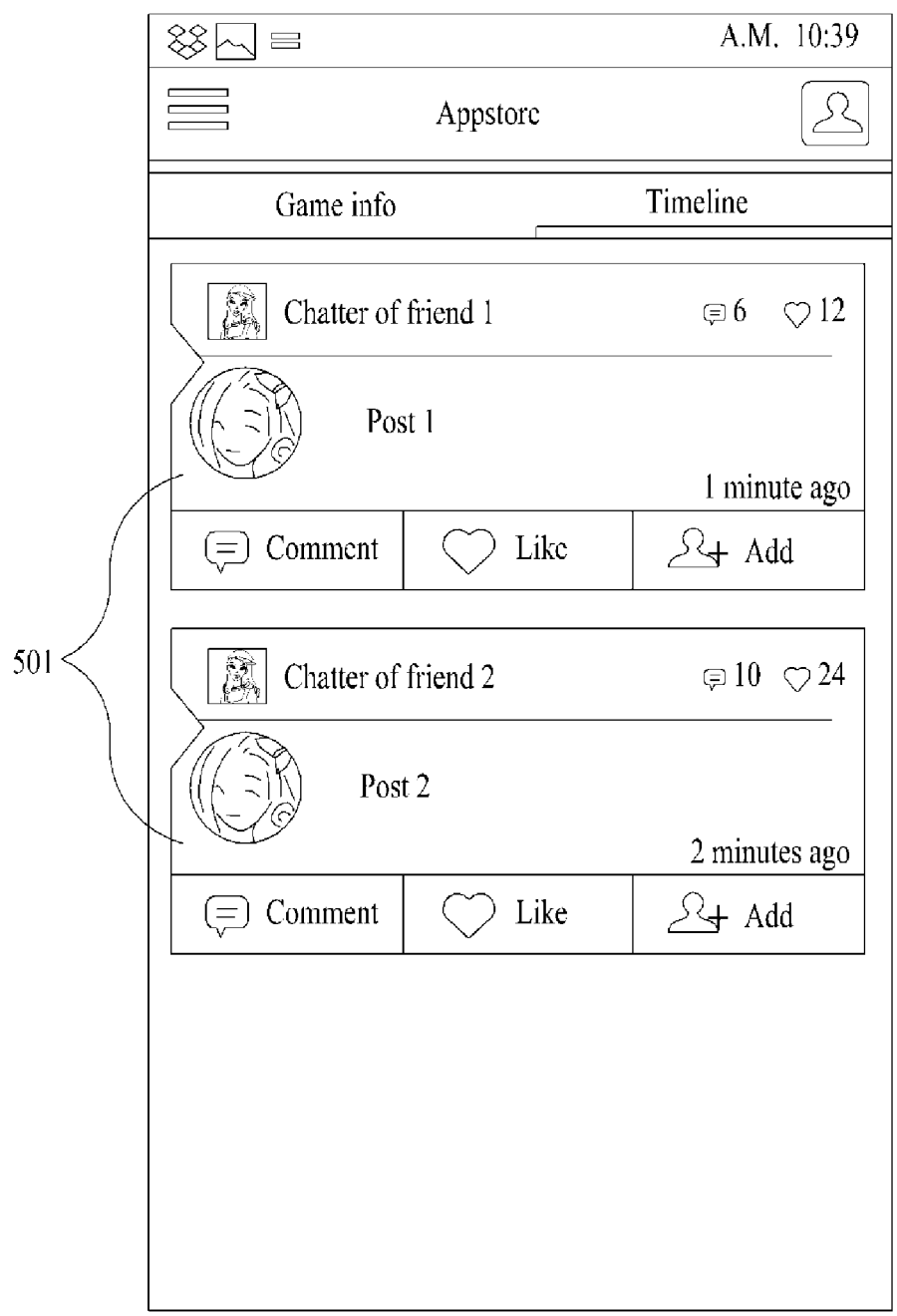
FIGS. 5 and 6 illustrate an example of a screen showing a timeline according to example embodiments.
Figure 6:
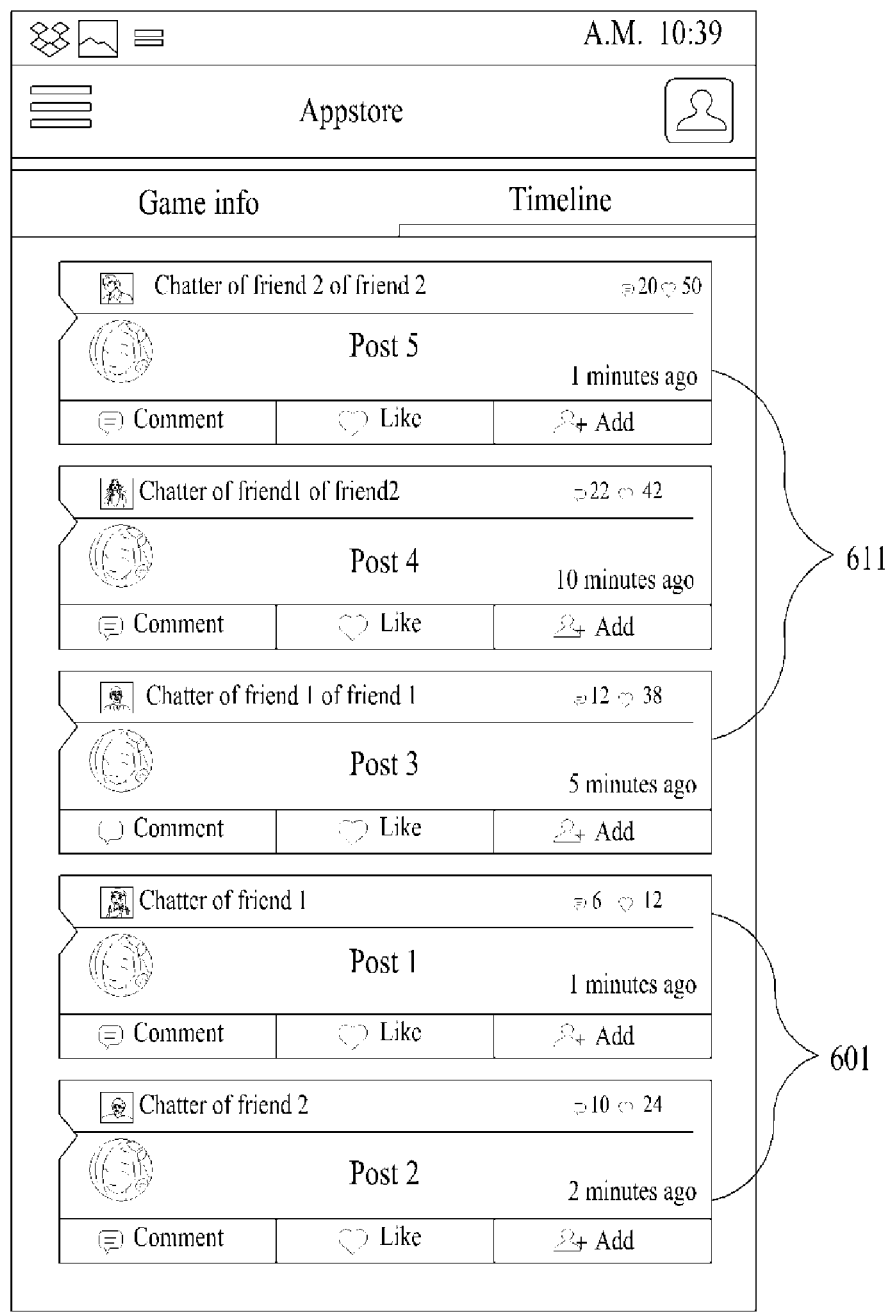

FIGS. 5 and 6 illustrate an example of a screen showing timeline according to example embodiments.

Referring to FIGS. 5 and 6, screens 500 and 600 show an example of a screen on which posts uploaded by users are sorted and displayed on a user terminal. Here, instead of displaying all the posts to a single user, posts, for example, friends having set a personal relationship with the corresponding user may be displayed at a timeline of the user.

Referring to FIG. 5, the screen 500 shows that posts 501 uploaded by friends having directly set a personal relationship with a user are sorted in order of time and displayed on a user terminal.

Referring to FIG. 6, according to completion in ranking of not-displayed posts among posts uploaded by friends having indirectly set a personal relationship with a user at the service server 100, ranked posts 611 may be displayed on the screen 600 together with posts 601 sorted in order of time and thereby displayed. In this instance, the ranked posts 611 may be displayed at an upper end of the screen 600, and the posts 601 may be displayed at a lower end of the screen 600. Additionally, a notification or event news provided from the service server 100 may be displayed as a post at a timeline of the user.

Figure 7:
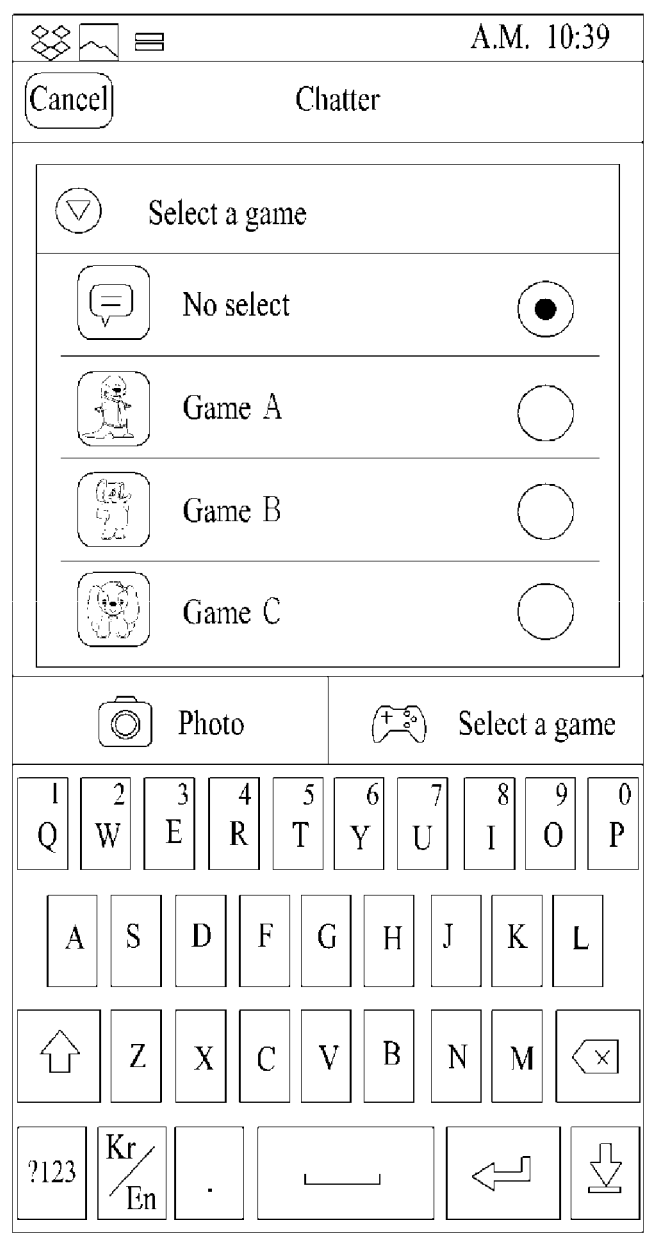
FIG. 7 illustrates an example of a screen showing a service selection according to example embodiments.

FIG. 7 illustrates an example of a service selection screen according to example embodiments.

Referring to FIG. 7, a screen 700 shows an example capable of selectively uploading a post for a timeline with respect to each game when an App described in the example embodiments provides a plurality of game Apps in an Appstore as a plurality of services.

For example, when a user touches a "select a game" interface in FIG. 4, the screen 700 in FIG. 7 may be displayed to the user. For example, when the user is to upload a post for informing an achievement level of the user with respect to a specific game or to upload a post for providing a game tip with respect to the game, the user may select a desired game using a user interface displayed on the screen 700. Here, a text, an image, a video, or a link associated with the specific game may be automatically added to the post with respect to the specific game.

The Appstore may provide a game download page for each game in the Appstore. Here, a post uploaded by the user by selecting the specific game may be displayed through a timeline of the user and timelines of other users, for example, friends, having set a personal relationship with the user, and may also be displayed through a game download page of the game. Accordingly, users that are to download the game may acquire a further large amount of information or tips about the game. Also, posts uploaded by selecting the specific game are highly likely to be posts of user having played the game in person and uploaded by other users having directly and indirectly set a personal relationship with the user and thus, users that are to download the game may acquire further excellent quality information or tips.

Additionally, in addition to posts uploaded by other users having set a personal relationship with a user, posts uploaded by other users without having a personal relationship with the user, who downloaded a corresponding game App may be displayed on a game download page.

Figure 8:
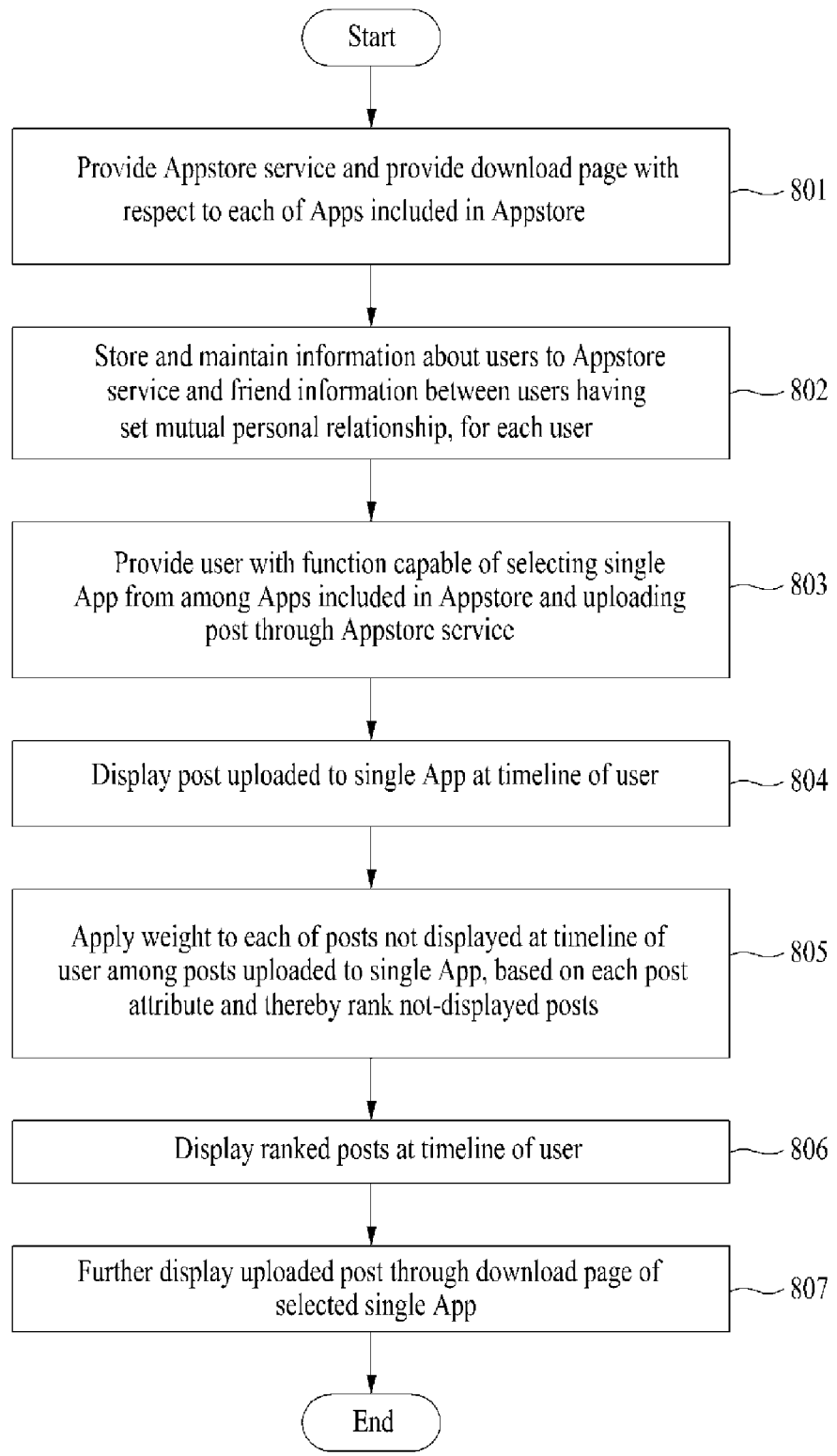
FIG. 8 is a flowchart illustrating a service method according to example embodiments.

FIG. 8 is a flowchart illustrating an example of a service method according to example embodiments. The service method may be performed by a service system. Here, the service system may correspond to the aforementioned service system 100. The service system may include at least one storage unit and at least one processor, and operations included in the service method may be processed by the at least one processor.

In operation step 801, the service system may provide an Appstore service and may provide a download page with respect to each of Apps included in an Appstore. For example, the Appstore service may be provided to users through an App, for example, an Appstore App installed in terminals of the users.

In operation step 802, the service system may store and maintain information about users registered to the Appstore service and friend information between users having set a mutual personal relationship, for each user. Here, the friend information may be stored and maintained in at least one storage unit according to processing of the at least one processor included in the service system.

In operation step 803, the service system may provide the user with a function capable of selecting a single App from among the Apps included in the Appstore and uploading a post through the Appstore service. The users may receive a user interface for selecting a single App from among the Apps included in the Appstore through the App, for example, the Appstore App installed in the terminals of the users, and may receive a user interface capable of uploading a post. In response to a selection of the user on the single App, the service system may verify information about the selected App and information about the post that are received from the terminal of the user.

In operation step 804, the service system may display the post uploaded to a single App at a timeline of the user.

For example, the service system may sort posts uploaded to the App by other users having directly set a personal relationship with the user in order of time, and thereby display the sorted posts through the timeline of the user. The other users having directly set the personal relationship with the user may be identified based on the aforementioned friend information.

In operation step 805, the service system may apply a weight to each of posts not displayed at the timeline of the user among posts uploaded to a single App, based on an attribute of each not-displayed post and thereby rank the not-displayed posts. Here, the posts not displayed at the time line may refer to posts uploaded by other users having indirectly set a personal relationship with the user.

In this instance, the service system may apply a different weight to each post based on a level of interest such as "like" counts over a not-displayed post, comment counts, subscription counts, click counts as favorite, favorite counts of the user over a creator of the not-displayed post, the number of friends of a post creator, and a distance between the user and the post creator.

For example, the service system may apply a relatively high weight compared to other parameters, such as the comment counts, the subscription counts, the click counts as favorite, and the number of friends of the post creator, by using, alone or in combination, primary parameters such as the level of interest, the distance, and favorite counts over the post creator. Here, an operation process of the service system that ranks not-displayed posts by applying a relatively high weight to the primary parameters compared to other parameters is described above with reference to FIG. 3 and thus, a further description related thereto is omitted here.

In operation step 806, the service system may display the ranked posts at the timeline of the user together with posts that are sorted in order of time and thereby displayed.

For example, the service system may sort posts uploaded by friends having directly set a personal relationship with a user in order of time and thereby display the sorted posts at a timeline and then, rank posts uploaded by friends having indirectly set a personal relationship with the user and thereby display the ranked posts at the timeline of the user together with the posts sorted in order of time. Here, the service system may display the ranked posts to be positioned at an upper end of the timeline compared to the posts sorted in order of time.

As described above, the service system may preferentially display posts uploaded by direct friends of the user at the timeline and then perform ranking at a background. Accordingly, it is possible to decrease system load and to solve user complaints about post delay occurring due to a ranking operation. Further, it is possible to provide the user with further reliable useful information about an App by displaying the ranked posts.

In operation step 807, the service system may further display the uploaded post through a download page of the selected single App. Friends having directly and indirectly set a personal relationship with the user are highly likely to upload further accurate and reliable good quality information about the App as posts. Accordingly, further excellent quality information may be added to the download page.

According to example embodiments, Apps in the Appstore may be Apps required to execute different games. In this example, the Appstore may function as a mobile game portal to provide a plurality of games.

According to example embodiments, the service system may add, to a post uploaded to a single App, at least one of a text, an image, a video, and a link associated with the single App and may display the uploaded post.

According to example embodiments, Apps in an Appstore may be Apps required to execute different SNSs such as different chats. In this example, the Appstore may function as a mobile SNS portal to provide a plurality of SNSs.

Figure 9:
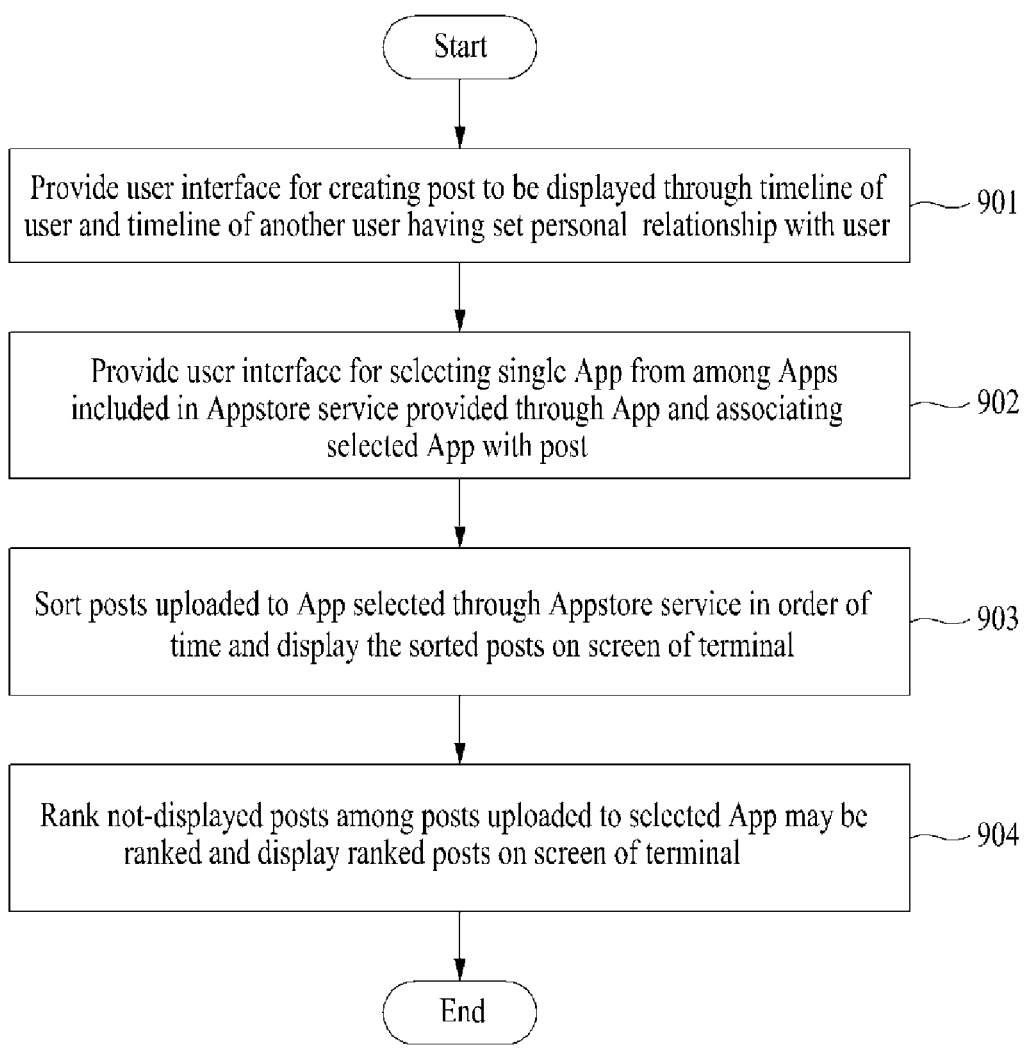
FIG. 9 is a flowchart illustrating a service method according to other example embodiments.

FIG. 9 is a flowchart illustrating another example of a service method according to example embodiments. The service method may be performed by a user terminal. An App for providing an Appstore service may be installed in a terminal. The App may include modules configured to control the terminal to perform operations included in the service method.

In operation step 901, the terminal may provide a user interface for creating a post to be displayed through a timeline of the user and a timeline of another user having set a personal relationship with the user. The other user having set the personal relationship with the user may be identified based on friend information maintained in a service server that provides an Appstore service. The friend information may include information about the users having a mutual personal relationship. Here, the service server may be similar to the service system of FIG. 7.

In operation step 902, the terminal may provide a user interface for selecting a single App from among Apps included in an Appstore service provided through the App and associating the selected App with the post. The user interface for associating a post and an App is already described with reference to FIG. 7 and thus, a further description related thereto is omitted here.

In operation step 903, posts uploaded to the App selected through the Appstore service may be sorted in order of time and displayed on a screen of the terminal.

For example, Apps in the Appstore may be Apps required to execute different games. Posts sorted in order of time may be displayed through a timeline of the selected Apps. Here, the posts sorted in order of time may refer to posts uploaded by other users having indirectly set a personal relationship with the user.

In operation step 904, not-displayed posts among posts uploaded to the selected App may be ranked and displayed on a screen of the terminal.

The ranked posts may be displayed through the timeline together with at least one of the posts that are sorted in order of time and thereby already displayed. For example, the ranked posts may be displayed at an upper end of the timeline and the posts sorted in order of time and thereby displayed may be displayed at a lower end of the timeline. Here, the ranked posts may refer to posts uploaded by friends having indirectly set a personal relationship with the user and a different weight may be applied to each of the ranked posts based on an attribute thereof. An operation of ranking posts by applying a different weight is described above with reference to FIG. 3 and thus, a further detailed description related thereto is omitted here.

A description not made in FIGS. 8 and 9 may refer to the description made above with reference to FIGS. 1 through 7.

According to example embodiments, the service system may provide a user with further reliable useful information and tips about an App by selecting the App of an Appstore and by ranking posts uploaded by other users having indirectly set a personal relationship with the user in association with the selected App and thereby displaying the ranked posts at a timeline.

Further, since the posts are displayed through a download page of the App as well as the timeline, users that are to download the App may acquire a large amount of good quality information or tips about the App.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software Apps that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A computer-implemented method of enabling a recommendation of an uploaded post associated with a software from a soft ware marketplace to a user terminal based on activities of the user's friend of an internet-based social network who is related to the first user terminal within the confines of the social network, said user maintaining an internet-based social network account, the method comprising:

providing, by the computer-implemented recommendation system, the software marketplace service to the user terminal;

providing, by the computer-implemented recommendation system, a download page with respect to each of softwares included in the software marketplace;

storing, by the computer-implemented recommendation system, information about the user's terminal registered to the software marketplace service and the user's friend information in at least one storage unit of the computer-implemented recommendation system;

providing, by the computer-implemented recommendation system, a function of selecting a single software from among a plurality of software in the software marketplace;

receiving, from the first user terminal, a selection of an interface associated with the single software selected in the software marketplace;

verifying, by the computer-implemented recommendation system, information about the selected software and another information about the first posts uploaded by the first user terminal;

displaying, by the computer-implemented recommendation system, the first posts of the selected software at a timeline of the user terminal along with posts uploaded by other users having a direct personal relationship with the user; and displaying, by the computer-implemented recommendation system, posts including the first posts through the download page with respect to the selected software, wherein the computer-implemented recommendation system retrieves the information of the user's friend and assigns a weight to each of second posts uploaded by other users having an indirect personal relationship with the user based on an attribute thereof, and ranks the second posts, wherein the ranking second posts uploaded by the other users having an indirect personal relationship with the user is performed during displaying the first posts and the posts uploaded by the other users having the direct personal relationship with the user, and wherein the ranked second posts are displayed at the timeline of the user terminal, separated from the first posts and the posts uploaded by other users having the direct personal relationship with the user at the timeline of the user terminal, and the ranked second posts are displayed through the downloaded page with respect to the selected software.

2. The method of claim 1, wherein the step of ranking second posts comprises:

ranking the not-displayed post based on at least one of a level of interest over the not-displayed post, comment counts, subscription counts, click counts as favorite, favorite counts of the user over a creator of the not-displayed post, the number of friends of a post creator, and a distance indicating a level of personal relationship between the user and the post creator.

3. The method of claim 2, wherein the step of ranking second posts further comprises:

assigning a relatively high weight to at least one of the favorite counts of the user over the creator of the not-displayed post, the distance, and the level of interest over the not-displayed post compared to the comment counts, the subscription counts, the click counts as favorite, and the number of friends of the post creator.

4. The method of claim 1, further comprising:

displaying posts uploaded to a selected single software in order of times at which the uploaded posts are created, and displaying a ranked post that aligns the ranked post to be displayed at an upper end of the timeline of the user, compared to the posts sorted in order of times and displayed at the timeline of the user.

5. The method of claim 1, wherein the softwares are applications used to execute different games in the software marketplace, respectively.

6. The method of claim 1, further comprising:

displaying a ranked post through a download page of the single application selected from among the applications comprised in the marketplace.

7. A non-transitory computer-readable storage medium storing a program to implement the method of claim 1.

* * * * *